(12) United States Patent
Gautard et al.

(10) Patent No.: US 11,749,425 B2
(45) Date of Patent: Sep. 5, 2023

(54) ENERGY RECOVERY DEVICE ON AT LEAST ONE POWER CONDUCTOR AND METHOD FOR MANUFACTURING THE RECOVERY DEVICE

(71) Applicant: SOCOMEC, Benfeld (FR)

(72) Inventors: Dominique Gautard, Varennes Vauzelles (FR); Thierry Save, Coulanges les Nevers (FR)

(73) Assignee: SOCOMEC, Benfeld (FR)

( * ) Notice: Subject to any disclaimer, the term of this patent is extended or adjusted under 35 U.S.C. 154(b) by 173 days.

(21) Appl. No.: 17/417,168

(22) PCT Filed: Feb. 26, 2020

(86) PCT No.: PCT/EP2020/054956
§ 371 (c)(1),
(2) Date: Jun. 22, 2021

(87) PCT Pub. No.: WO2020/178084
PCT Pub. Date: Sep. 10, 2020

(65) Prior Publication Data
US 2022/0059257 A1    Feb. 24, 2022

(30) Foreign Application Priority Data
Mar. 7, 2019 (FR) ...................................... 1902317

(51) Int. Cl.
*H01B 11/00* (2006.01)
*H01B 11/14* (2006.01)
(Continued)

(52) U.S. Cl.
CPC ............. *H01B 11/146* (2013.01); *H01F 3/06* (2013.01); *H01F 38/14* (2013.01); *H02J 50/001* (2020.01)

(58) Field of Classification Search
CPC ......... H01B 11/146; H01F 3/06; H01F 38/14; H02J 50/001
See application file for complete search history.

(56) References Cited

U.S. PATENT DOCUMENTS 5,142,105 A * 8/1992 Kihlken ............... H01B 13/341
174/72 A
10,014,091 B2    7/2018 Lopez Gomez et al.
(Continued)

FOREIGN PATENT DOCUMENTS

EP    0999565     5/2000
EP    1912224 A1  4/2008
(Continued)

OTHER PUBLICATIONS

FR2784496 English Translation (Year: 2000).*
WO/2014026300 English Translation (Year: 2014).*

*Primary Examiner* — Pete T Lee
(74) *Attorney, Agent, or Firm* — FORGE IP, PLLC

(57) ABSTRACT

A device for recovering electrical energy includes a ferromagnetic cable helically wound around a portion of a power conductor, and disposed to form both a magnetic system which is capable of sensing the magnetic field induced by a current passing through the power conductor, and a way to generate a utilisable induced voltage from this magnetic field. The ferromagnetic cable is produced from an assembly of unitary strands produced from ferromagnetic material, these strands being assembled into the form of a stranded wire, each unitary strand behaving as a winding in which the induced voltage is induced, and the assembly of unitary strands forming an assembly of windings connected in parallel by way of connecting terminals provided at the ends of the ferromagnetic cable to recover the induced voltage.

26 Claims, 3 Drawing Sheets

(51) Int. Cl.
*H01F 3/06* (2006.01)
*H01F 38/14* (2006.01)
*H02J 50/00* (2016.01)

(56) References Cited

U.S. PATENT DOCUMENTS

| | | | | |
|---|---|---|---|---|
| 2007/0108201 | A1* | 5/2007 | Vinegar | E21B 43/17 219/770 |
| 2009/0266575 | A1 | 10/2009 | Yoshimoto et al. | |
| 2013/0213133 | A1* | 8/2013 | Bertolami | G01P 3/02 73/490 |
| 2021/0065971 | A1 | 3/2021 | Gautard et al. | |
| 2021/0137766 | A1* | 5/2021 | Pedrocchi | A61H 3/008 |

FOREIGN PATENT DOCUMENTS

| | | |
|---|---|---|
| FR | 2784496 | 4/2000 |
| FR | 3076657 | 7/2019 |
| WO | WO2014026300 | 2/2000 |
| WO | WO2011106455 A1 | 9/2011 |

\* cited by examiner

ENERGY RECOVERY DEVICE ON AT LEAST ONE POWER CONDUCTOR AND METHOD FOR MANUFACTURING THE RECOVERY DEVICE

TECHNICAL FIELD

The present invention relates to an electrical energy recovery device comprising at least one ferromagnetic cable helically wound around at least a portion of a power conductor to form a magnetic system which is capable of sensing the magnetic field induced by a current passing through said power conductor, and means for generating an induced voltage from this magnetic field which can be utilised.

The invention also relates to a method for manufacturing a recovery device as described hereinabove.

PRIOR ART

More and more sensors, systems or accessories are installed on electrical networks to provide the functions of protection, monitoring, metering, etc. In most cases, these devices need to be supplied with electrical energy. One solution consists in taking this electrical energy from the power conductors in which an electrical current flows with the aid of energy recovery devices based on the principle of self-induction, thus avoiding the use of an additional energy source (battery, renewable energy, etc.). To this end, a magnetic core is fixed around a power conductor through which a current passes and which forms a primary circuit. This current creates a radial magnetic field around the power conductor, which induces the circulation of a magnetic flux in the magnetic core. An electrical winding is wound around this magnetic core to form a secondary circuit. Thus, the magnetic flux circulating in the magnetic core induces a voltage at the terminals of this winding. The induced voltage recovered at the terminals of this electrical winding makes it possible to self-supply different types of device, examples being one or more temperature, position, current, wear, etc. sensors, one or more illumination, signaling, communication, etc. elements, without these examples being limiting.

To date, two energy recovery solutions are known. One of the solutions consists of a wound toroidal type magnetic core, which may be closed or opening, which is fixed to the power conductor. The opening torus solution is mainly adopted because it makes it possible to install a recovery device easily, including on great length power conductors. The other solution consists of a magnetic core in the form of a ferromagnetic cable on which a copper wire is wound. This ferromagnetic cable is helically wound around the power conductor.

The invention is more particularly concerned with the ferromagnetic cable solution, which has the advantage of being able to be installed more easily than a torus, whatever the type of configuration and the place of installation of the power conductors. However, the external diameter of this recovery device formed by the ferromagnetic cable on which the winding is wound is increased, which has the effect of stiffening the device and of preventing it from being wound around small diameter power conductors (typically less than 20 mm).

The publication WO 2014/026300 A1 describes an application in which the energy recovery device supplies an illuminated strip equipped with light emitting diodes intended to mark out a power conductor. This energy recovery device is constituted by a ferromagnetic cable on which a winding of copper or other conductive material is wound. The useful voltage is recovered at the terminals of the winding in order to self-supply the illuminated strip.

Patent application FR1850064 from the Applicant describes a flexible and opening torus, formed from a ferromagnetic cable on which a copper winding is wound, constituting a current transformer intended for the detection of fault currents and/or for the measurement of the current flowing in the power conductor.

In these two cases, the energy recovery device is constituted by a magnetic core in the form of a ferromagnetic cable and an external winding formed from an electrically conductive material wound around this magnetic core. The winding is generally produced from a conductive wire (copper, aluminium, or the like) which is insulated and wound directly around the magnetic core or on an intermediate support, over a length which is sufficient to generate the desired voltage.

Existing energy recovery devices have a large diameter and are not flexible enough to be capable of being wound around small diameter power conductors. Existing solutions therefore do not allow for easy integration of an energy recovery device into any type of installation, and even less so around any type of power conductor.

DISCLOSURE OF THE INVENTION

The present invention aims to overcome these disadvantages by proposing a method and a device for recovering energy which make it possible to dispense with the external winding which is helically wound around a ferromagnetic cable, with the aim of reducing its external diameter and regaining sufficient flexibility to be able to be wound onto any type of power conductor, whatever their diameter, in order to ensure easy integration of this device into any type of installation, and thus to expand its potential for use in any type of application requiring self-supply of electrical systems from at least one power conductor.

To this end, the invention relates to an energy recovery device of the type indicated in the preamble, characterized in that said at least one ferromagnetic cable is constituted by an assembly of unitary strands produced from ferromagnetic material, assembled in the form of a stranded wire and disposed to provide said ferromagnetic cable with flexibility in all directions, enabling it to be wound around said power conductor whatever its diameter, and in that said means for generating an induced voltage form an integral part of said at least one ferromagnetic cable.

Thus, the means for generating an induced voltage are included in the diameter of the ferromagnetic cable and do not have a detrimental effect on either its bulk or its flexibility.

In a first embodiment, these means comprise at least one unitary strand of electrically conductive material assembled with said unitary strands produced from ferromagnetic material in order to constitute said at least one ferromagnetic cable. In this case, said at least one electrically conductive unitary strand constitutes a winding in which said induced voltage is generated and comprises connecting terminals at its ends, making it possible to recover said induced voltage.

In a second embodiment, these means are merged with said at least one ferromagnetic cable, each unitary strand of ferromagnetic material behaving as a winding in which said induced voltage is generated. In this case, said unitary strands form an assembly of windings connected in parallel by means of connecting terminals fixed to the ends of said at least one ferromagnetic cable, making it possible to recover said induced voltage.

In a preferred embodiment of the invention, said unitary strands are assembled into intermediate stranded wires, and said intermediate stranded wires are assembled into a final stranded wire to constitute said at least one ferromagnetic cable. Said unitary strands and said intermediate stranded wires are advantageously twisted in the same direction of rotation.

The total number of unitary strands constituting said at least one ferromagnetic cable is advantageously a multiple of three, and the diameter of the unitary strands is preferably less than one millimetre, and preferably less than 0.5 mm.

Depending on the applications, the ferromagnetic material of said unitary strands may be a material with a high relative magnetic permeability selected from iron-nickel alloys with at least 70% nickel, and preferably 78% to 81% nickel, or a material with a lower relative magnetic permeability but with an induction saturation of greater than or equal to 1.5 Tesla, selected from iron-nickel alloys with at most 55% nickel, and iron-based alloys.

Depending on the variational embodiments of the invention, said unitary strands may or may not be electrically insulated from each other.

If the unitary strands are not electrically insulated from one another, then all of the unitary strands contained in said at least one ferromagnetic cable must have the same shape and travel along the same path so as to embrace the same section of said ferromagnetic cable so that they are all at the same potential and so that no current flows from one unitary strand to the other.

In the preferred embodiment, said connecting terminals are crimped onto the ends of said ferromagnetic cable in order to connect all the unitary strands in parallel.

To this end, the invention also relates to a manufacturing method of the type indicated in the preamble, characterized in that said at least one ferromagnetic cable is manufactured from an assembly of unitary strands produced from ferromagnetic material by a twisting method for assembling said unitary strands together into the form of a stranded wire, and in that said means for generating an induced voltage are integrated into said at least one ferromagnetic cable during its manufacture.

BRIEF DESCRIPTION OF THE FIGURES

The present invention and the advantages thereof will become clearer from the following description of several embodiments given by way of non-limiting example and made with reference to the accompanying drawings, in which.

DETAILED DESCRIPTION OF THE INVENTION

Figure 1:
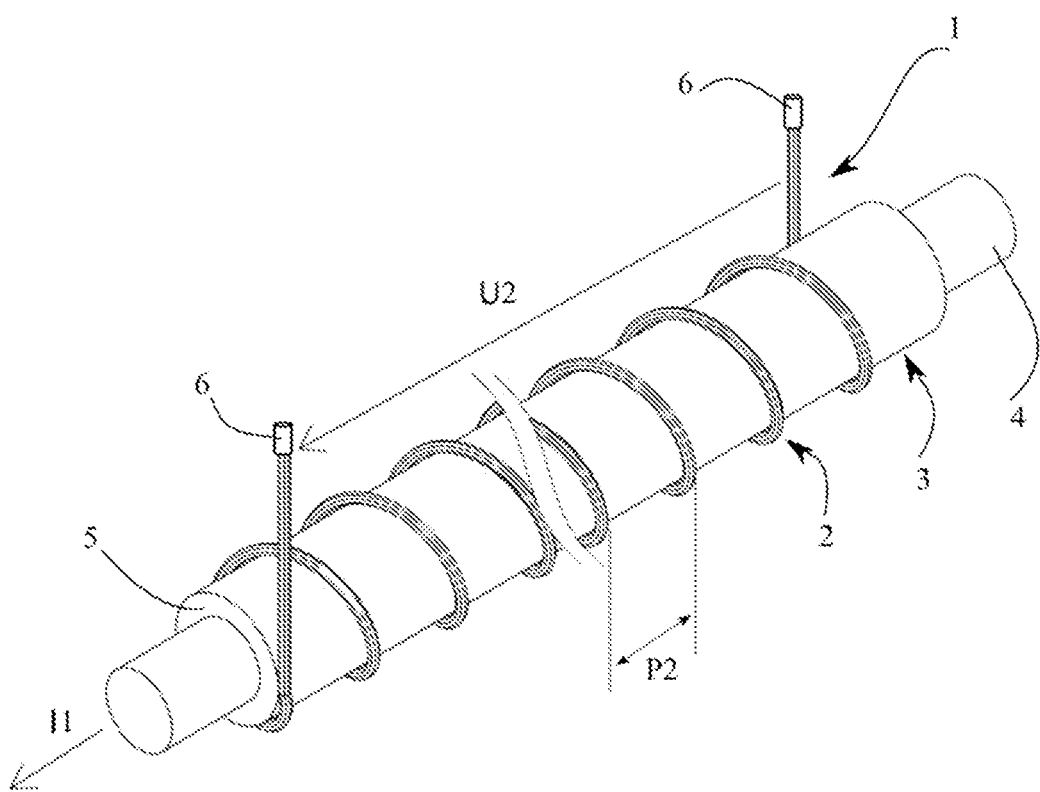
FIG. 1 is a perspective view of an energy recovery device in accordance with the invention, provided with a ferromagnetic cable wound around a portion of a power conductor.

In the exemplary embodiments shown, elements or portions which are identical from one figure to another carry the same reference numbers.

With reference to the figures, the electrical energy recovery device 1 in accordance with the invention comprises at least one ferromagnetic cable 2 which is helically wound around a portion 3 of a power conductor 4, the latter being electrically insulated by a sheath 5 and through which a current I1 which is also known as the primary current I1 flows. The ferromagnetic cable 2 thus forms a magnetic circuit or a magnetic system which is capable of sensing the magnetic field induced by the primary current I1 passing through the power conductor 4.

Advantageously, the ferromagnetic cable 2 is constituted by an assembly of unitary strands 20 of ferromagnetic material, assembled into the form of a stranded wire. This type of construction makes it possible to provide said ferromagnetic cable 2 with flexibility in all directions, facilitating it being wound around a power conductor 4 whatever its diameter, even the smallest diameters, depending, of course, on the external diameter of said cable. As an example, the following rule may be utilised: the diameter of the power conductor 4 plus its insulating sheath 5 may be at least twice the diameter of the ferromagnetic cable 2 ($\Phi 4 \geq 2 \times \Phi 2$), but this rule is not limiting.

The recovery device 1 further comprises means 10 for generating an induced voltage U2 from this magnetic field which can be utilised. The term "voltage which can be utilised" should be understood to mean a voltage which is sufficient for either self-supply of one or more electrical systems such as, by way of non-limiting examples, one or more sensors for temperature, position, current, wear, etc., one or more illumination, signaling, communication elements, etc., or to supply an image of the primary current I1 or to detect leakage currents in an electrical installation, without these examples of applications being limiting. By way of example, the exploitable voltage must be at least equal to 3 volts, but this value is not limiting.

Unlike the recovery devices of the prior art, the means making it possible to generate an induced voltage which can be utilised do not consist of an external copper winding which is helically wound around said ferromagnetic cable, but form an integral part of said ferromagnetic cable 2. Thus, they do not penalize either the external diameter or the flexibility of the ferromagnetic cable.

Figure 3:
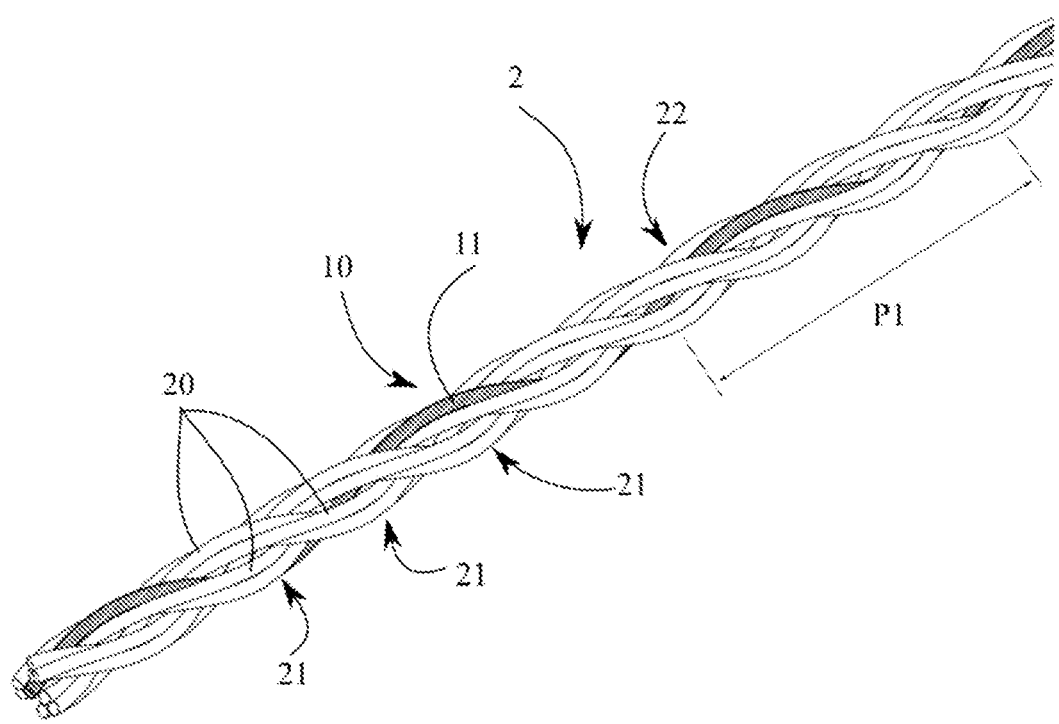
FIG. 3 is an enlarged view of a section of the energy recovery device in accordance with a second variational embodiment.

In a first variational embodiment of the invention illustrated in FIG. 3, the means 10 for generating an induced voltage U2 comprise at least one unitary strand 11 produced from electrically conductive material which is electrically insulated and assembled with the other unitary strands 20 of ferromagnetic material to constitute said ferromagnetic cable 2. In this case, the conductive unitary strand 11, which may be constituted by at least one copper wire or the like, constitutes a winding in which the induced voltage U2 is generated and comprises connecting terminals at its ends (not shown) making it possible to recover said induced voltage U2. This conductive unitary strand 11 can replace one of the other unitary strands 20 produced from ferromagnetic material, as illustrated in FIG. 3. Clearly, the number of conductive unitary strands 11 may be greater than one, and its arrangement within the ferromagnetic cable 2 may differ, the essential part being that it should be integrated during the manufacture of said cable. The method of manufacturing said ferromagnetic cable 2 may correspond to that described below with reference to the second variational embodiment of the invention.

In a second variational embodiment of the invention illustrated in the other figures, the means for generating an induced voltage U2 coincide with said ferromagnetic cable 2. The primary current I1 which flows in the power conductor 4 induces a magnetic flux in the assembly of unitary strands 20 constituting the cable. It has incidentally been discovered that, as a function of the manner in which the unitary strands 20 are wound around each other, each unitary strand 20 embraces a certain fraction of the total cross-section of the ferromagnetic cable 2 and behaves as a winding in which a voltage is induced. Thus, all the unitary strands 20 form an assembly of windings connected in parallel by means of connecting terminals 6 provided at the ends of said ferromagnetic cable 2 and between which an induced voltage U2 is present.

This embodiment appears to run counter to good sense, because the person skilled in the art is not encouraged to use ferromagnetic materials as electrical conductors. In fact, ferromagnetic materials are known to be poorer conductors of electricity than copper, they are more resistive and they generate losses by the Joule effect.

However, tests have shown that the level of induced voltage U2 present at the ends of the ferromagnetic cable 2 may be sufficient for the envisaged applications, and that it depends on several parameters and in particular on the manner in which the unitary strands 20 are twisted, on the number of unitary strands 20, on the total cross-section of the ferromagnetic cable 2, on the length of the twisting pitch P1 of the unitary strands 20 and on the winding pitch P2 of the ferromagnetic cable 2 around the power conductor 4. In addition, this induced voltage level U2 is proportional to the length of the ferromagnetic cable 2, and also depends on the choice of ferromagnetic material constituting the unitary strands 20.

The Ferromagnetic Material For some of the conditions of use of said energy recovery device 1 (domestic network, low power load in a building, or the like), the generation of a maximum induced voltage level U2 with the lowest possible primary current I1 in the power conductor 4 is sought, of the order of a few amperes (for example 10 A). For this purpose, the ferromagnetic material utilised for the unitary strands 20 must have a high relative magnetic permeability, of the order of a few thousand. Alloys of the iron-nickel type with at least 70% nickel, and preferably 78% to 81% nickel, are therefore preferred.

For other conditions of use of said energy recovery device 1 (heavy industry, mines, or the like), in which the primary current I1 in the power conductor 4 is always at a high level, a minimum of a few tens of amperes, it is possible to use a ferromagnetic material with a lower relative magnetic permeability but with a higher saturation induction (for example greater than or equal to 1.5 Tesla), such as alloys of the iron-nickel type with at most 55% nickel, and other iron-based alloys. In fact, the primary current I1 is sufficient to saturate the ferromagnetic material with a lower permeability than that of the 80% iron-nickel alloy, and the high saturation of said material has the effect of increasing the induced voltage U2.

The Cable Structure

The ferromagnetic cable 2 is constituted by a plurality of unitary strands 20 of sufficiently small diameter to maintain good flexibility: typically from a few hundredths of a millimetre to a few millimetres, in particular from 0.10 mm to 0.40 mm, and preferably from 0.2 mm, without these values being limiting. The number of unitary strands 20 is adjusted so as to obtain a total cross section of ferromagnetic material which is necessary for obtaining the desired induced voltage U2. These unitary strands 20 are twisted together either in a single stranded wire for small cable sections (for example less than 2 mm$^2$), or in several intermediate stranded wires 21 for the others. The unitary strands 20 and the intermediate stranded wires 21 in the same ferromagnetic cable 2 must necessarily be wound in the same direction of rotation (clockwise or anticlockwise), so that the induced voltages do not cancel each other out.

The unitary strands 20 may be insulated from one another. Not insulating them from one another is also a possibility. In the latter case, they are in permanent contact with each other and could therefore create short-circuits. To avoid this, the voltage gradient must be zero in each section of the ferromagnetic cable 2, whatever its position on the power conductor 4. Under these conditions, there is no potential difference between the unitary strands 20 and no current can flow from one unitary strand to another.

To obtain this result, all the unitary strands 20 contained in a ferromagnetic cable 2 must have the same shape in order to travel along the same path and embrace the same section throughout the length of the ferromagnetic cable 2.

The twisting parameters of the various intermediate stranded wires 21, constituted by the twisting pitch P1 and the number of unitary strands 20, must make it possible to satisfy this condition while complying as far as possible with the rules of the art as regards the manufacture of twisted cables.

The Number of Strands

The intended aim is to manufacture a ferromagnetic cable 2 composed of the largest number of unitary strands 20 with the smallest possible number of intermediate stranded wires 21 in order to maintain flexibility of the cable.

To be sure that all the unitary strands 20 have the same shape, that is to say that they are all wound or twisted in an identical manner, only combinations of two, three or four unitary strands 20 are theoretically possible. Beyond four unitary strands 20, there is at least one unitary strand 20, namely that situated in the centre, which stays straight or which does not describe the same path as the others. The combination with four strands is only suitable if the unitary strands 20 are correctly disposed with respect to each other in a square, but is difficult or even impossible to industrialize. Combinations with two or three unitary strands 20 are preferred, and that with three unitary strands 20 represents the preferred combination. This theoretical rule of three strands does not have to be respected in the context of industrial manufacture if the results obtained remain satisfactory, as demonstrated below.

Figure 2:
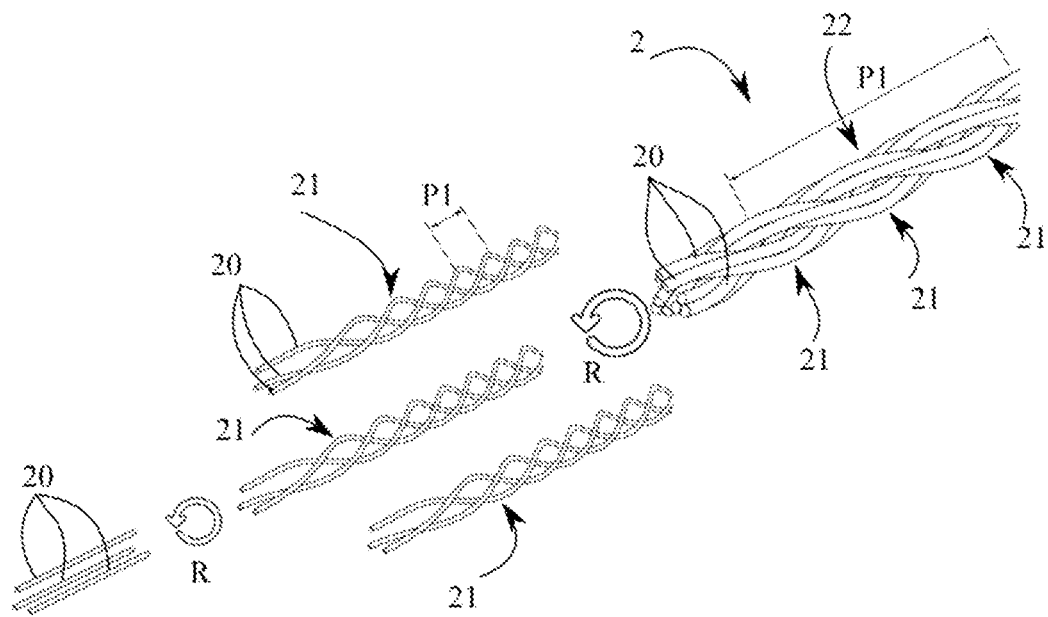
FIG. 2 is a diagram showing the steps for manufacturing the energy recovery device in accordance with a first variational embodiment.

With more particular reference to FIG. 2, the manufacture of a ferromagnetic cable 2 with the preferred combination requires at least the following two steps:

First step: take three parallel unitary strands 20 and twist them together in a direction symbolized by arrow R to form a first intermediate stranded wire 21, then repeat the same operation twice more to form two other intermediate stranded wires 21, each obtained from three unitary strands 20, Second step: twist the three intermediate stranded wires 21 obtained together in the same direction symbolized by the arrow R to obtain a final stranded wire which forms said ferromagnetic cable 2.

Naturally, this number of steps is not limited to two, but may comprise N steps until the desired number of unitary strands 20 and the desired section of the magnetic system are obtained. Preference is given to a number of unitary strands 20 which is a multiple of 3. The greater the number of unitary strands 20, the greater the surface area for sensing the magnetic field induced by the primary current I1 passing through the power conductor 4, and the greater the level of the induced voltage U2.

Tests have shown that it takes about a hundred unitary strands 20 with a diameter of 0.1 mm to 0.4 mm, preferably 0.2 mm, to obtain a section of ferromagnetic cable 2 making it possible to achieve a sufficient level of induced voltage U2. This finding would involve manufacturing the cable in four steps to assemble 3×3×3'4, i.e. 108 unitary strands 20, which is difficult to achieve industrially and is expensive. The tests also made it possible to observe that the parameters of the last intermediate stranded wires 21 (the largest) are the most important. It is therefore possible not to comply with the theoretical rule of three strands on the intermediate stranded wires 21 of level 1. Finally, the tests have made it possible to demonstrate that it is possible to increase the number of unitary strands 20 up to twelve in the intermediate strands 21 of level 1. Beyond this number of strands, the induced voltage level U2 in the ferromagnetic cable 2 decreases.

To illustrate the possible combinations, mention may be made, by way of non-limiting example, of the following industrial embodiment:

First step: take twelve parallel unitary strands 20 and twist them together in one direction of rotation to form a first intermediate stranded wire 21 of level 1, then repeat the same operation eight times more to form eight other intermediate stranded wires 21 of level 1, each obtained from twelve unitary strands 20, Second step: twist together three intermediate stranded wires 21 of level 2 obtained in the same direction of rotation, then repeat the same operation twice more to form two other intermediate stranded wires 21 of level 2, each obtained from three intermediate stranded wires 21 of level 1, Third step: twist together the three intermediate stranded wires 21 of level 2 obtained in the same direction of rotation to obtain a final stranded wire which forms said ferromagnetic cable 2 containing one hundred and eight unitary strands in total.

The Twisting Pitch

The twisting parameter which significantly influences the induced voltage level U2 is the pitch P1 of the stranded wire or the twisting pitch P1. In a ferromagnetic cable 2 constituted by several intermediate stranded wires 21, it is necessary to take into account the pitch P1 of each intermediate stranded wire 21, represented diagrammatically in FIG. 2. Reducing the pitch P1 increases the number of turns per unit length and consequently the number of equivalent winding turns. This result has the effect of increasing the induced voltage level U2. However, the length of the pitch P1 must comply as much as possible with the rules of the art as regards the manufacture of the twisted cables, in order to maintain good flexibility of the cable and to avoid excessive deformation of the strands and the risk of breakage. By way of indication, the rules of the art suggest that the length of the pitch, P1 min, is not less than five times the diameter of the cable obtained after twisting (P1 min≥5×Φ finished cable). In the context of the invention and in order to increase the induced voltage U2, twisting parameters will be selected which respect this lower limit, or even which will be below this lower limit.

Winding Onto the Power Conductor

The parameters for winding the ferromagnetic cable 2 around the power conductor 4 also have an influence on the phase and the level of the induced voltage U2.

If the direction of twisting of the ferromagnetic cable 2 is the same as the direction of winding onto the power conductor 4, the induced voltage U2 will be in phase with the primary current I1. If the direction of twisting of the ferromagnetic cable 2 is reversed with respect to the direction of winding onto the power conductor 4, the induced voltage U2 will be in phase opposition with the primary current I1.

Furthermore, it has been found that for a given primary current value I1, the induced voltage U2 at the ends of a ferromagnetic cable 2 is slightly higher, if the direction of twisting of the ferromagnetic cable 2 is the same as the direction of winding onto the power conductor 4, than if the directions are reversed. Preference will then be given to a twisting direction identical to the winding direction.

Finally, the smaller the winding pitch P2 (FIG. 1), the higher will be the induced voltage U2. For conditions of use or manufacturing methods in which the ferromagnetic cable 2 is helically wound onto a great length power conductor 4, the winding pitch P2 must not be greater than three times the diameter of the power conductor 4 (P2≤3×Φ4).

The Length of the Cable

The induced voltage U2 which is available at the ends of the ferromagnetic cable 2 is proportional to the length of this cable. To obtain a sufficient induced voltage U2, for example a voltage equal to at least 3 volts, several metres of cable will be necessary. The distance between the connecting terminals for recovering this induced voltage U2 will therefore also be several metres, which can pose operating problems. Different solutions have been studied in order to bring the two connecting terminals 6 side by side.

Figure 4:
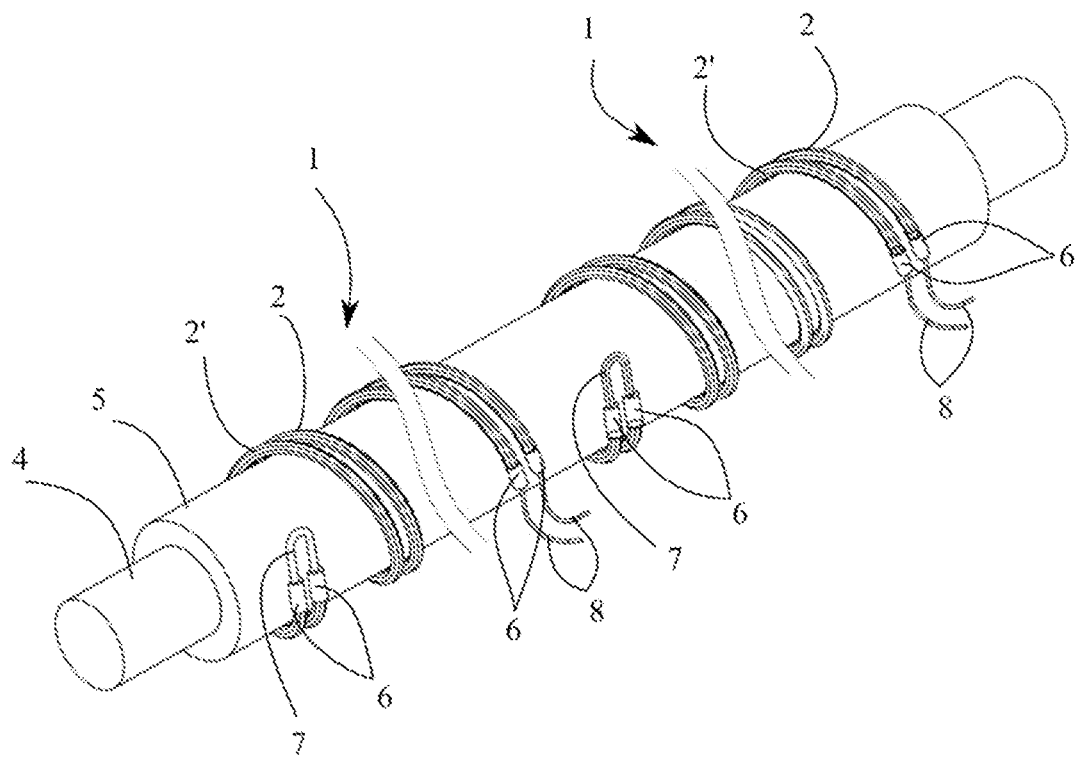
FIG. 4 is a view similar to FIG. 1 of an energy recovery device provided with two ferromagnetic cables connected in series and wound around a portion of a power conductor, showing the connecting terminals located on the same side of the device.
Figure 5:
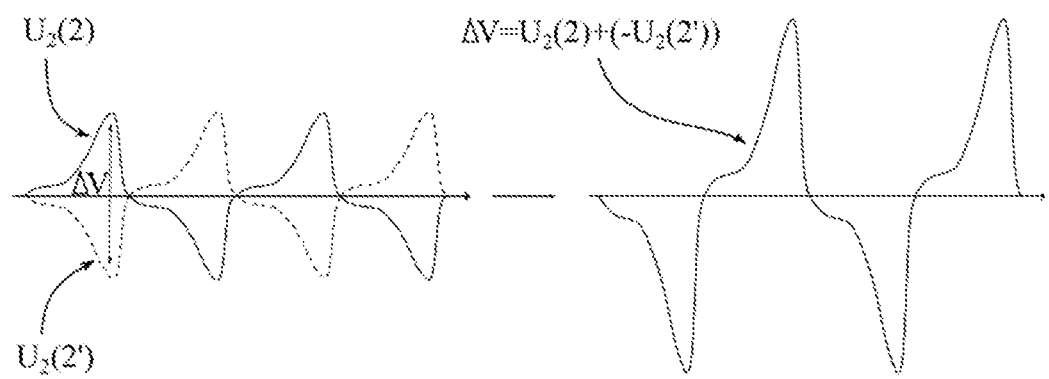
FIG. 5 represents graphs of the voltages in the device of FIG. 4.

FIG. 4 illustrates one of the solutions in which the recovery device 1 comprises two ferromagnetic cables 2, 2', a first cable forming a "forward" path and a second cable forming a "return" path on said power conductor 4. FIG. 4 shows two independent or serially connected energy recovery devices 1 distributed over the length of a great length power conductor 4. In this solution, the two ferromagnetic cables 2, 2' of the same recovery device 1 are identical, absolutely must be twisted in opposite directions, are connected in series by a bridge 7 and are wound in parallel onto the power conductor 4. The free ends of these two ferromagnetic cables 2, 2', each comprising a connecting terminal 6, meet on the same side of the recovery device 1, and can thus easily be connected to self-power an electrical device or to measure and/or to detect current. The series connection of these two ferromagnetic cables 2, 2' makes it possible to add the induced voltages U2. Thus, and as illustrated in FIG. 5, the total voltage recovered between the connecting terminals 6 corresponds to twice the value of the induced voltage U2 in a single ferromagnetic cable 2.

Another solution (not shown) consists of replacing the second ferromagnetic cable 2' with at least one unitary wire or strand of electrically conductive material to make the "return" path. In this case and as in the preceding example, the ferromagnetic cable 2 and the return wire are connected in series and are wound onto the power conductor 4 in parallel. The respective free ends of the ferromagnetic cable 2 and of the return wire each comprise a connecting terminal which meet on the same side of the recovery device 1.

In the variational embodiment of the invention in which the unitary strands 20 are not individually insulated, all these strands are at the same potential at a given point. The connecting terminals 6 must make it possible to connect them all together to a conductor in order to self-power an electrical system or to detect current. It will be possible to use connecting terminals 6 in the form of tubular sleeves crimped on one side onto the ends of the ferromagnetic cable 2 to clamp the unitary strands 20 against each other and thus provide the electrical contacts and the mechanical strength of the intermediate stranded wires 21, and on the other side onto the conductive wires 8 ensuring the electrical connection with the electrical device to be supplied. All the unitary strands 20 are thus placed in parallel so as to constitute a conductor with a large cross section. This solution is quick, simple, and inexpensive. It can be extended to the production of the bridge 7 to place the ferromagnetic cables 2, 2' (see FIG. 4) in series. Naturally, any other type of connecting terminal fulfilling the same functions is possible.

The recovery device 1 described above may be fixed to the power conductor 4 by any known and suitable technical means such as by adhesion, bonding, crimping, etc., or in fact by adding a heat-shrinkable protective sheath or the like.

It is clear from this description that the invention makes it possible to achieve the set goals, namely a new generation of high-performance, versatile and inexpensive energy recovery devices, without external secondary winding, by virtue of a ferromagnetic cable 2 having a very specific construction which allows it to carry out a dual function by itself: that of a magnetic core and that of a secondary winding. Thus, the invention offers a self-powering solution for any electrical device at lower cost, but also an alternative detection solution to conventional current sensors.

In fact, the value for the induced voltage U2 at the ends of the ferromagnetic cable 2 is a more or less accurate image of the primary current I1 which flows in the power conductor 4 onto which this cable is helically wound. It is therefore possible to use this recovery device 1 to make current sensors enabling primary current I1 to be measured or leakage currents to be detected.

The present invention is clearly not limited to the exemplary embodiments described herein, but encompasses all amendments and alternatives that are clear to a person skilled in the art. In particular, the construction parameters for the ferromagnetic cable 2 may vary as a function of the intended applications.

The invention claimed is:

1. A device for recovering electrical energy, comprising at least one ferromagnetic cable which is helically wound around at least a portion of a power conductor in order to form a magnetic system which is capable of sensing the magnetic field induced by a current passing through said power conductor, and means for generating an induced voltage from this magnetic field which can be utilised, characterized in that said at least one ferromagnetic cable is constituted by an assembly of unitary strands produced from ferromagnetic material, assembled in the form of a stranded wire and disposed to provide said at least one ferromagnetic cable with flexibility in all directions, enabling said at least one ferromagnetic cable to be wound around said power conductor whatever the diameter of said power conductor, and in that said means for generating an induced voltage form an integral part of said at least one ferromagnetic cable.

2. The recovery device as claimed in claim 1, characterized in that said means for generating an induced voltage comprise at least one unitary strand produced from electrically conductive material assembled with said unitary strands of ferromagnetic material in order to constitute said at least one ferromagnetic cable, and in that said at least one electrically conductive unitary strand constitutes a winding in which said induced voltage is generated and comprises connecting terminals at its ends, making it possible to recover said induced voltage.

3. The recovery device as claimed in claim 1, characterized in that said means for generating an induced voltage coincide with said at least one ferromagnetic cable, in that each unitary strand of ferromagnetic material behaves as a winding in which the said induced voltage is generated, and in that said unitary strands form an assembly of windings connected in parallel by means of connecting terminals fixed to the ends of said at least one ferromagnetic cable, making it possible to recover said induced voltage.

4. The recovery device as claimed in claim 1, characterized in that said unitary strands are assembled into intermediate stranded wires, and in that said intermediate stranded wires are assembled into a final stranded wire constituting said at least one ferromagnetic cable.

5. The recovery device as claimed in claim 4, characterized in that said unitary strands and said intermediate stranded wires are twisted in the same direction of rotation.

6. The recovery device as claimed in claim 4, characterized in that the total number of unitary strands constituting said at least one ferromagnetic cable is a multiple of three.

7. The recovery device as claimed in claim 1, characterized in that the diameter of the unitary strands is less than one millimetre.

8. The recovery device as claimed in claim 1, characterized in that the ferromagnetic material of said unitary strands is a material with high relative magnetic permeability selected from iron-nickel alloys with at least 70% nickel.

9. The recovery device as claimed in claim 1, characterized in that the ferromagnetic material of said unitary strands is a material with a poorer relative magnetic permeability, but with an induction saturation of greater than or equal to 1.5 Tesla, selected from iron-nickel alloys with at most 55% nickel, and iron-based alloys.

10. The recovery device as claimed in claim 1, characterized in that said unitary strands are electrically insulated from each other.

11. The recovery device as claimed in claim 1, characterized in that said unitary strands are not electrically insulated from each other.

12. The recovery device as claimed in claim 11, characterized in that all of the unitary strands contained in the said at least one ferromagnetic cable have the same shape and travel along the same path so as to embrace the same section of the said ferromagnetic cable, so that they are all at the same potential and no current flows from one unitary strand to the other.

13. The recovery device as claimed in claim 1, characterized in that said connecting terminals are crimped onto the ends of said ferromagnetic cable in order to connect all the unitary strands in parallel.

14. A method for manufacturing an electrical energy recovery device as claimed in claim 1, said device comprising at least one ferromagnetic cable disposed to be helically wound around at least a portion of a power conductor and form a magnetic device which is capable of sensing the magnetic field induced by a current passing through said power conductor, and means for generating a utilisable induced voltage from this magnetic field, characterized in that said at least one ferromagnetic cable is manufactured from an assembly of unitary strands of ferromagnetic material by a twisting method for assembling said unitary strands together into the form of a stranded wire, and in that said means for generating an induced voltage are integrated into said at least one ferromagnetic cable during its manufacture.

15. The manufacturing method as claimed in claim 14, characterized in that at least one unitary strand of electrically conductive material is utilised as the means for generating an induced voltage, assembled by said twisting method with said unitary strands produced from ferromagnetic material in order to constitute said at least one ferromagnetic cable, in a manner such that said at least one electrically conductive unitary strand constitutes a winding in which said induced voltage is induced, and in that the ends of said at least one unitary strand are equipped with connecting terminals enabling said induced voltage to be recovered.

16. The manufacturing method as claimed in claim 14, characterized in that said at least one ferromagnetic cable is utilised as the means for generating an induced voltage, in a manner such that each unitary strand of ferromagnetic material behaves as a winding in which said induced voltage is induced, and in that all of said unitary strands forming an assembly of windings are connected in parallel by means of connecting terminals added to the ends of said at least one ferromagnetic cable making it possible to recover said induced voltage.

17. The manufacturing method as claimed in claim 14, characterized in that said unitary strands are assembled by means of said twisting method in order to form intermediate stranded wires, and in that said intermediate stranded wires are assembled by said twisting method in order to form a final stranded wire corresponding to said at least one ferromagnetic cable.

18. The manufacturing method as claimed in claim 17, characterized in that said unitary strands and said intermediate stranded wires are twisted in the same direction of rotation.

19. The manufacturing method as claimed in claim 17, characterized in that a total number of unitary strands which is a multiple of three is used in order to manufacture said at least one ferromagnetic cable.

20. The manufacturing method as claimed in claim 14, characterized in that fine unitary strands with a diameter of less than one millimetre, are selected.

21. The manufacturing method as claimed in claim 14, characterized in that unitary strands are used which are constituted by a material with high relative magnetic permeability selected from iron-nickel alloys with at least 70% nickel.

22. The manufacturing method as claimed in claim 14, characterized in that unitary strands are used which are constituted by a material with a lower relative magnetic permeability, but with an induction saturation of greater than or equal to 1.5 Tesla, selected from iron-nickel alloys with at most 55% nickel, and iron-based alloys.

23. The manufacturing method as claimed in claim 14, characterized in that unitary strands are used which are electrically insulated from each other.

24. The manufacturing method as claimed in claim 14, characterized in that bare unitary strands are used which are not electrically insulated from each other.

25. The manufacturing method as claimed in claim 24, characterized in that, in the twisting method, the unitary strands are positioned with respect to each other so that all the unitary strands contained in said at least one ferromagnetic cable have a same shape and travel the same path so as to embrace the same section of said ferromagnetic cable so that they are all at the same potential and so that no current flows from one unitary strand to the other.

26. The manufacturing method as claimed in claim 14, characterized in that said connecting terminals are crimped directly onto the ends of said ferromagnetic cable in order to connect all of the unitary strands in parallel.

* * * * *